Nov. 13, 1928.

C. B. McDONALD 1,691,778

METHOD OF FORMING VALVE TAPPETS

Filed April 18, 1927

Inventor
Charles B. McDonald
By Whittemore Hulbert Whittemore
Belknap
Attorneys

Patented Nov. 13, 1928.

1,691,778

UNITED STATES PATENT OFFICE.

CHARLES B. McDONALD, OF DETROIT, MICHIGAN, ASSIGNOR TO WILCOX PRODUCTS CORPORATION, OF DETROIT, MICHIGAN, A CORPORATION OF MICHIGAN.

METHOD OF FORMING VALVE TAPPETS.

Application filed April 18, 1927. Serial No. 184,705.

The invention relates to the manufacture of headed articles such as valve tappets where for any reason it is desirable to separately form the head and stem and subsequently unite the same. It is an object of the invention to obtain a mechanical joint between the two parts which will rigidly unite the same and which is not dependent upon welding, brazing or other means of integration. My improvementment is particularly adapted for the uniting of parts formed of dissimilar metals which cannot be united by welding and where it is desirable to have different inherent qualities in said parts. The invention therefore consists in the method as hereinafter set forth.

In the manufacture of valve tappets it is usual to form the same with a head portion having a hardened surface for engagement with the cam and a stem portion having a threaded socket at its upper end for engagement with the adjusting screw; also to reduce the weight and consequently the inertia of the device the walls of the stem with the exception of the threaded socket portion are made comparatively thin. Such a structure is difficult to manufacture from an integral blank and furthermore the metal suitable for the formation of the head is not as suitable for the stem. Thus, for the head white cast iron is suitable as this would present a very hard surface to the cam but if the whole structure were made of this material it would not possess the requisite mechanical strength. On the other hand steel which is well adapted for the formation of the stem is not as suitable for producing the head with the desired properties. It is also impossible to obtain the necessary mechanical strength by uniting parts formed of such dissimilar materials through welding or brazing while mechanical joints as heretofore made would greatly increase the cost of manufacture.

My improved method overcomes the difficulties above referred to by simultaneously fashioning and mechanically uniting the two members while locally rendering plastic through electric heat. This may be accomplished by placing the parts together in a welding brace of suitable construction and after heating, pressing them together so that they will mutually fashion each other with an interlocking joint.

Figure 1:
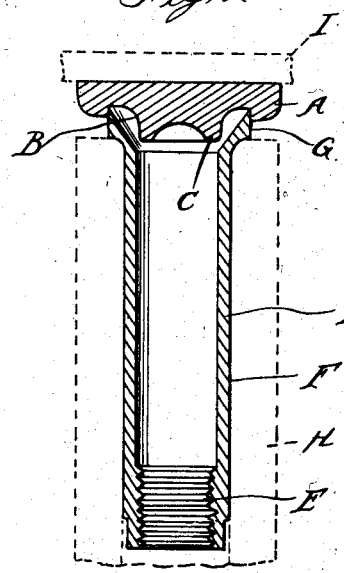
Figure 1 is a longitudinal section showing a valve tappet head and stem and is formed prior to the mechanical interlocking of the same.
Figure 2:
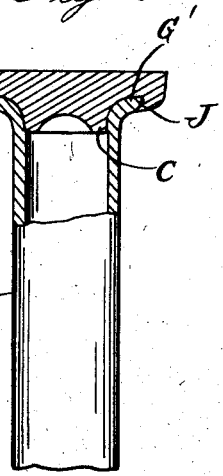
Figure 2 is a similar view showing the parts united.

As shown, in Figures 1 and 2ᴬ is a head member formed of white cast iron as therein shown provided with an annular recess B and an outwardly projecting central portion C. The stem D which may be machined from a steel has the threaded socket E at one end, the thin walled center section F and the enlarged portion G at the opposite end. This enlarged portion is tapered to a substantial knife edge while in cross section it forms diametrically opposite side wedges the axes of which are oppositely inclined to the axis of the stem.

Figure 3:
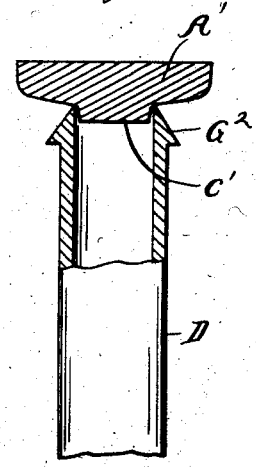
Figures 3 and 4 are views similar to Figures 1 and 2, showing a modified construction.
Figure 4:
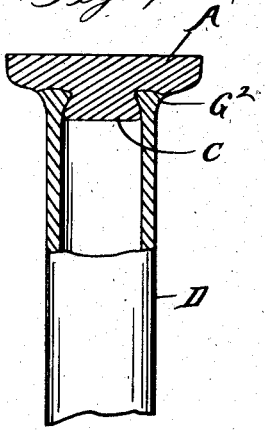

The parts being thus formed to unite the stem member D is placed in a suitable electric welder being engaged with the socket H indicated by the dotted lines and which forms one of the electrodes. The member A is then placed in engagement with the member D, the enlarged portion G of the latter entering the annular recess B. The cooperating electrode I indicated in dotted lines is then placed against the member A and the electric current is passed through the members. This will produce a localized heating effect at the point of greatest resistance, viz, where the knife edge of the wedge bears against the bottom of the recess B and from this point will progressively heat the adjacent metal so as to produce an annular plastic portion in the member A extending radially outward to beyond the diameter of the recess B. Pressure is then applied to move said members toward each other with the result that the wedge sections of the member B will move substantially in the direction of their respective axes thereby undercutting and interlocking with the member A. It will be understood that the proportions of the member A on opposite sides of the plastic zone form guides which mechanically deflect the softened metal of the portion G so that it will conform to the shape of the member A as well as penetrating the latter to form the interlock. The final form is as shown in Figure 2 where the outwardly deflected portion G' underlaps the annular portion J of the head, With the modified construction shown in Figures 3 and 4 the only difference is that the portion G² of the member D is fashioned to produce opposite wedge sections having their axes inclined inwardly instead of outwardly. With this construction no recess is formed in the member A' but only the centrally projecting portion C' which forms a guide for properly aligning the two members. After heating and pressing the parts will assume the position of Figure 4 where the portion G² has undercut the center portion C' and has been conformed to the surface of the member A' to accurately fit the same.

With both constructions the strength of the structure is due to the mechanical joint but at the same time the softened metal in the two parts along the line of contact will sufficiently unite to produce in effect an integral structure.

Figure 5:
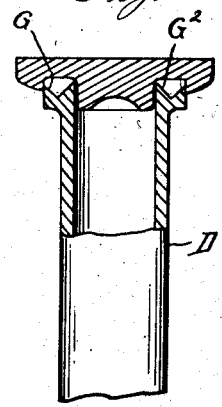
Figures 5 and 6 are similar views of Figures 1 and 2 showing still another modification.
Figure 6:
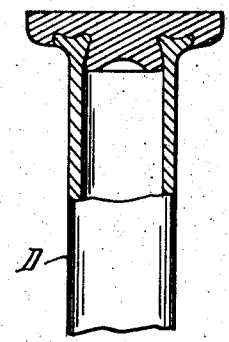

The construction shown in Figures 5 and 6 is a combination of the structures shown in Figures 1, 2, 3 and 4. As shown in Figure 5 the member D is formed with the annular wedge G² inclining inward and the annular wedge G inclining outward. The apex of the wedge G² is slightly in advance of the apex of the wedge G, so that contact is first made there with the result that an inward undercut is produced which is somewhat greater than the outward undercut produced by the wedge G. In the complete structure as shown in Figure 6 there is thus the double interlock with the head which gives an additional element of security.

While I have specifically described the application of my process to the formation of valve tappets it is evident that the same process may be applicable to the production of other similar articles where two parts formed of different metals are to be mechanically united.

What I claim as my invention is:

1. The method of mechanically uniting metal members which consists in first forming one of said members with spaced end portions of wedge shaped cross section, the axes of said wedges being inclined to each other, in contacting said wedge portions with the complementary member, passing electrical current therethrough to locally heat and soften the adjacent metal and in pressing the members together to force said wedge portions into interlocking engagement with the complementary member.

2. The method of uniting a metallic head member to a metallic shank member which consists in forming at one end of said shank member an annular portion of wedge-shaped cross section, the axes of the wedges on diametrically opposite sides being inclined to each other, in contacting said annular portion with the head member and passing electrical current therethrough to locally heat and soften the adjacent metal and in pressing said members toward each other to force the wedge section into interlocking engagement with the head.

3. The method of uniting a metallic head member with a tubular shank member which consists in forming the end of said tubular shank of wedge-shaped cross section with the central axis of the wedge inclined to the axis of the tubular member, in contacting the apex of the wedge with the head member and passing electrical current therethrough to locally heat and soften the adjacent metal and in pressing said members toward each other to force the wedge section into interlocking engagement with the head.

4. The method of uniting a metallic head member with a shank member which consists in forming the annular end of the shank member of a wedge-shaped cross section, the central axis of the wedge being at an angle to the axis of the shank and one side of the wedge being substantially parallel to said axis of the shank, in forming the head member with a concentric guide for engagement with the parallel sides of the wedge to align said members, contacting the apex of the wedge with said head member passing electrical current therethrough to locally heat and soften the adjacent metal and forcing the members together to conform the one to the other and to form a mechanical interlock.

5. The method of joining the metallic head member with a metallic shank member which consists in forming said shank member with an annular end portion of wedge shaped cross section, the axis of the wedges on diametrically opposite sides converging, in forming the head member with a central projection for guiding said annular wedge to align said members, contacting the apex of the wedge with the head member, passing electrical current therethrough to locally heat and soften the adjacent metal and pressing said members together whereby said wedge is forced inward to undercut said head member and to be conformed and to mechanically interlock therewith.

6. The method of uniting a cast iron member with a member formed of steel which consists in forming the steel member with spaced portions of wedge-shaped cross section, the central axes of the wedges being at an angle to each other, in contacting the apices of the wedges with said cast metal member, passing electrical current therethrough to locally heat and soften the adjacent metal and in pressing the members together to force said wedge portions through nonparallel paths to produce interlocking engagement with the head member.

In testimony whereof I affix my signature.

CHARLES B. McDONALD.